(12) United States Patent
Stavely et al.

(10) Patent No.: US 6,943,842 B2
(45) Date of Patent: Sep. 13, 2005

(54) IMAGE BROWSING USER INTERFACE APPARATUS AND METHOD

(75) Inventors: Donald J Stavely, Windsor, CO (US); Amy E Battles, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 721 days.

(21) Appl. No.: 10/005,407

(22) Filed: Nov. 2, 2001

(65) Prior Publication Data

US 2003/0086012 A1 May 8, 2003

(51) Int. Cl.[7] .............................................. H04N 5/222
(52) U.S. Cl. .................. 348/333.05; 715/716; 715/812; 715/813; 715/838
(58) Field of Search ........................ 348/333.05, 231.2, 348/333.01, 333.02, 231.3; 715/811, 812, 838, 810, 835

(56) References Cited

U.S. PATENT DOCUMENTS 6,249,316 B1 * 6/2001 Anderson .............. 348/333.05
6,801,251 B1 * 10/2004 Kawaoka et al. ........ 348/231.3
2003/0169349 A1 * 9/2003 Aoi et al. ................ 348/231.2

FOREIGN PATENT DOCUMENTS

EP 0 978 987 A2 * 9/2000 ............ H04N/1/00

* cited by examiner

Primary Examiner—James J. Groody
Assistant Examiner—Brian Jelinek
(74) Attorney, Agent, or Firm—Thomas M. Croft

(57) ABSTRACT

An image browsing user interface provides convenient viewing of both individual images and groups of images. The user interface provides a convenient way to view both individual images and a preferred image from each group of images. The individual and preferred images may be uploaded to an external device or selectively processed by the external device.

8 Claims, 12 Drawing Sheets

IMAGE BROWSING USER INTERFACE APPARATUS AND METHOD

FIELD OF THE INVENTION

The present invention relates generally to image capture, storage, or display systems and more specifically to user interfaces for image browsing.

BACKGROUND OF THE INVENTION

In some situations, a device capable of storing and displaying digital images may contain a collection of images comprising a mixture of individual images and groups of related images. For example, some digital cameras are capable of taking pictures in both standard and "burst mode," in which a series of photographs (typically of the same subject) is taken within a short period. A related feature is "video mode," in which a digital camera takes photographs at a frame rate supporting full motion. Some digital cameras also allow a user to group arbitrary individual images in a desired fashion. All these features result in potentially complex collections of digital images containing both individual images and groups of images. Such complex collections of images may also exist in devices such as palmtop computers, personal computers, or other image capture, storage, or display devices. Navigating among and displaying these disparate types of images using a conventional user interface can be challenging, even cumbersome. It is thus apparent that there is a need in the art for an improved user interface for image browsing.

SUMMARY OF THE INVENTION

An image browsing user interface and associated method of operation are provided. The user interface comprises control logic, a display, and functions for viewing both individual images and preferred images, each preferred image belonging to a group of images.

Other aspects and advantages of the present invention will become apparent from the following detailed description, taken in conjunction with the accompanying drawings, illustrating by way of example the principles of the invention.

DETAILED DESCRIPTION OF THE INVENTION

The capability of navigating among and displaying both individual images and images belonging to groups of images is facilitated by providing an image browsing user interface that displays a primary set of images comprising individual images and preferred images. For example, each preferred image may be a user's favorite image among a group of images. Prior to a user having specified a preferred image for a group of images, the chronologically first image within the group of images may, by default, be the preferred image. A preferred image may be conveniently designated, for example, as the last image viewed within a particular group of images. Alternatively, a user may manually designate a particular image within a group of images as the preferred image. The inventive user interface also facilitates displaying images within a group of images and designating a different preferred image for that group of images. Additionally, the primary set of images may be selectively uploaded to an external device such as a printer or computing device. Further, all stored images other than those in the primary set may be deleted conveniently using a "delete others" function. Alternatively, all images may be uploaded, and the external device may selectively process the primary set.

Figure 1:
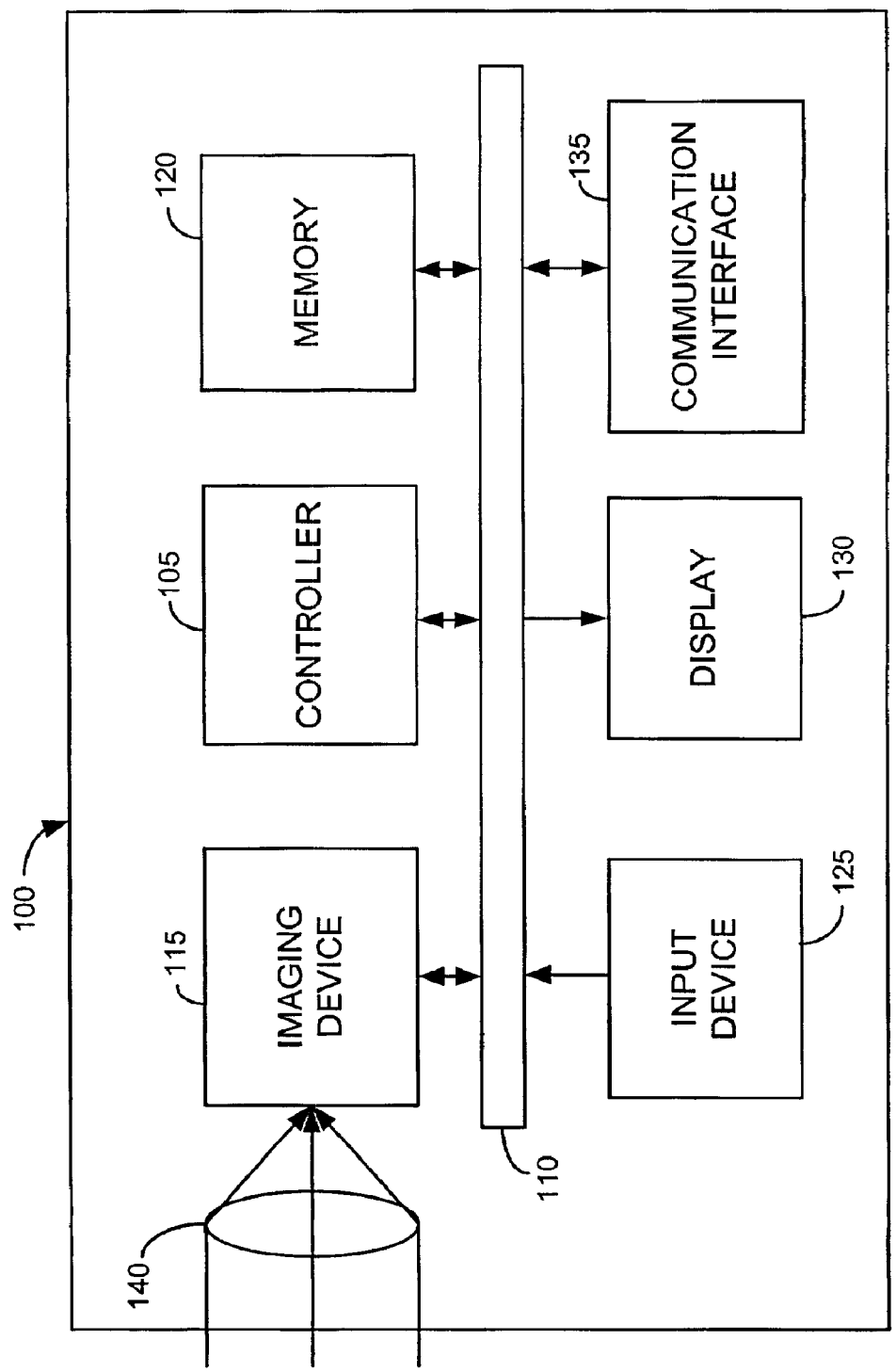
FIG. 1 is a block diagram of a digital camera in accordance with an exemplary embodiment of the invention.

FIG. 1 is a block diagram of a digital camera 100 in accordance with an exemplary embodiment of the invention. In FIG. 1, controller 105 communicates via data bus 110 with imaging device 115, memory 120, input device 125, display 130, and communication interface 135. Imaging device 115 converts optical images received from optical system 140 to digital images, which may be stored in memory 120. In a typical implementation, imaging device 115 comprises a charge-coupled device (CCD), an analog-to-digital converter (A/D), a gain control, and a digital signal processor (DSP) (not shown in FIG. 1). Controller 105 typically comprises a microprocessor or other central processing unit (CPU), and input device 125 may comprise one or more buttons or switches for controlling the operation of digital camera 100. Display 130 is typically of the color liquid-crystal-diode (LCD) type. Communication interface 135 comprises hardware and software for communicating with an external device such as a printer or computer. Memory 120 typically comprises flash memory, random-access memory (RAM), or a combination thereof.

Throughout this detailed description, "digital image" and "image" will be used interchangeably. Each image stored in digital camera 100, for the purposes of this description, is assumed to be either an individual image or an image belonging to a group of images. Groups of images comprise, for example, bursts of images captured in burst mode, video sequences captured in video mode, time-elapsed photographs that digital camera 100 automatically associates with one another, or groups of arbitrary individual images a user has chosen to define as a group. Hereinafter, "group of images" denotes any of the foregoing or similar types of image groupings. Likewise, "individual image" denotes an image that does not belong to a group of images.

Figure 2:
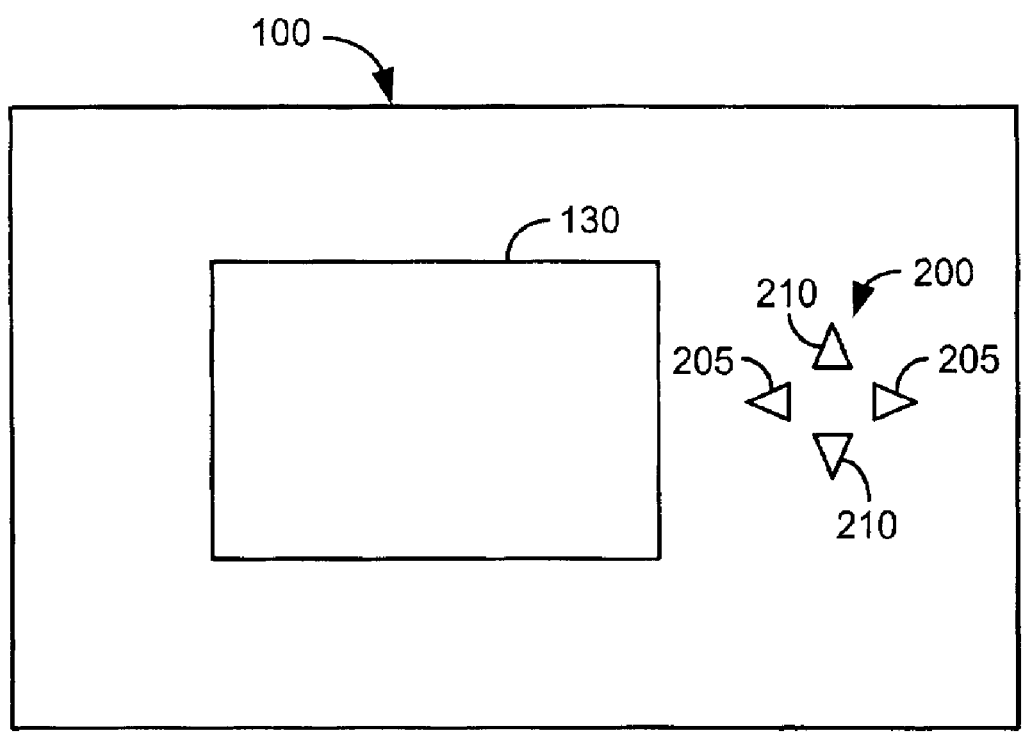
FIG. 2 is an illustration of a digital camera user interface in accordance with an exemplary embodiment of the invention.

FIG. 2 is an illustration of a digital camera user interface in accordance with an exemplary embodiment of the invention. The user interface functions shown in FIG. 2, in a typical implementation, may be located on the back of digital camera 100. Although a digital camera typically requires additional user interface elements, only those relevant to the instant invention are shown in FIG. 2. Display 130 is used to compose pictures before they are taken and to view images stored in digital camera 100. Display 130 may allow one stored image to be viewed at a time or, in other embodiments, may allow a group of reduced-size or "thumbnail" images to be viewed simultaneously. Input controls 200 are used in navigating among and displaying stored images on display 130. Horizontal input control 205 comprises two opposing directional modes, which may be implemented as separate buttons, as shown in FIG. 2, or as a single control element having two positions. Likewise, vertical input control 210 comprises two opposing directional modes that are orthogonal to those of horizontal input control 205. Vertical input control 210 may also be implemented as two separate buttons or as a single control element having two positions. Alternatively, both horizontal input control 205 and vertical input control 210 may be implemented as a single control element having four positions.

Figure 3A:
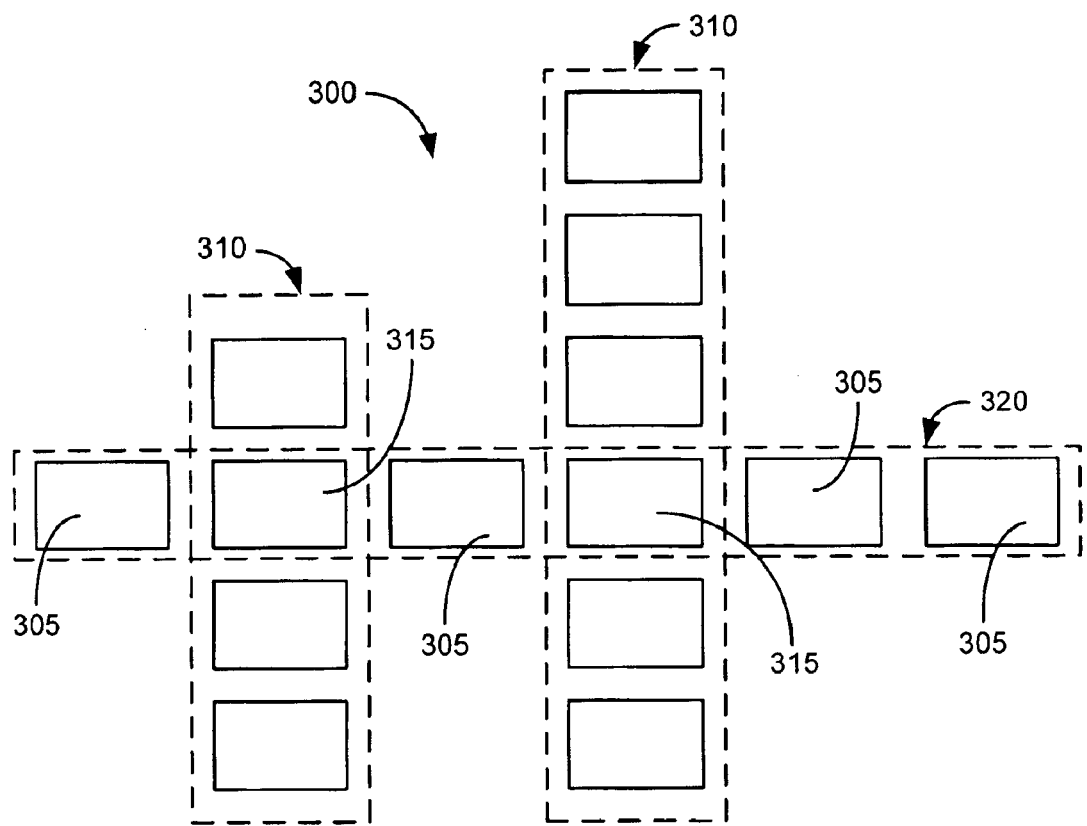
FIG. 3A is a diagram of an organizational scheme for images stored in a digital camera in accordance with an exemplary embodiment of the invention.

FIG. 3A is a diagram showing an organizational scheme for images 300 stored in digital camera 100 in accordance with an exemplary embodiment of the invention. FIG. 3A is a conceptual rather than literal representation of how images may be organized in digital camera 100. Within memory 120, images are divided into two categories: individual images 305 and images belonging to groups of images 310. Within each group of images 310, one image is designated as a preferred image 315, which may be a user's favorite image among the associated group. How preferred images 315 are designated as such will be explained in a later portion of this description. The set of images comprising all individual images 305 and preferred images 315 will, for purposes of this description, be called the "primary set" 320. Note that each preferred image 315 belongs to two sets of images, a group of images 310 and primary set 320.

Figure 3B:
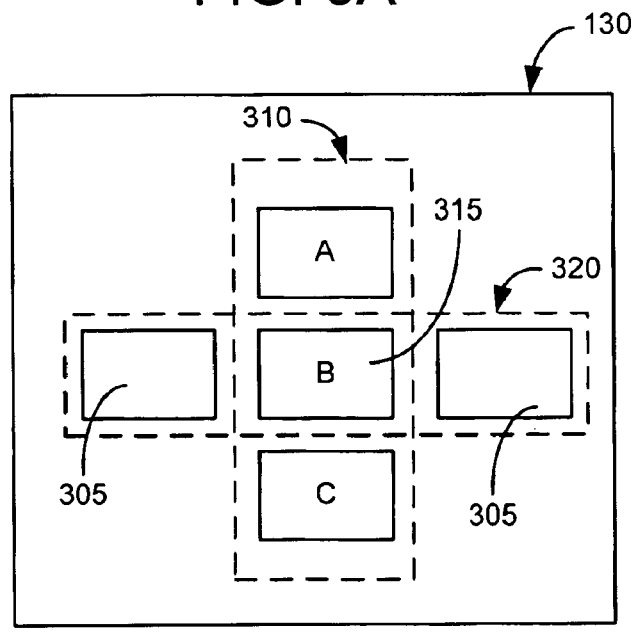
FIG. 3B is an illustration of the use of thumbnail images on a digital camera display in accordance with an exemplary embodiment of the invention.

FIG. 3B shows an example of how thumbnail images may be viewed on display 130 of digital camera 100 in accordance with an exemplary embodiment of the invention. In FIG. 3B, images belonging to primary set 320, such as individual images 305 and preferred image 315 (marked "B"), are displayed in the horizontal dimension. Images belonging to groups of images 310, such as the images marked "A" and "C," are displayed in the vertical dimension, corresponding closely to the conceptual framework of FIG. 3A. Alternatively, the images in a group of images 310 may be overlapped somewhat with preferred image 315 on top. Appropriate user interface controls, to be described next, may be used to navigate among the displayed images in both dimensions while maintaining the 3×3 viewable grid shown in FIG. 3B. In general the thumbnails may be displayed in an M×N grid, depending on the application and the size of the display. Even though more than one image is visible at a time when thumbnails are used, one specific image may, in addition, be "selected" for operations such as enlargement, alteration, or deletion. In embodiments in which only one image is shown at a time on display 130, the currently displayed image may be automatically selected.

Figure 4:
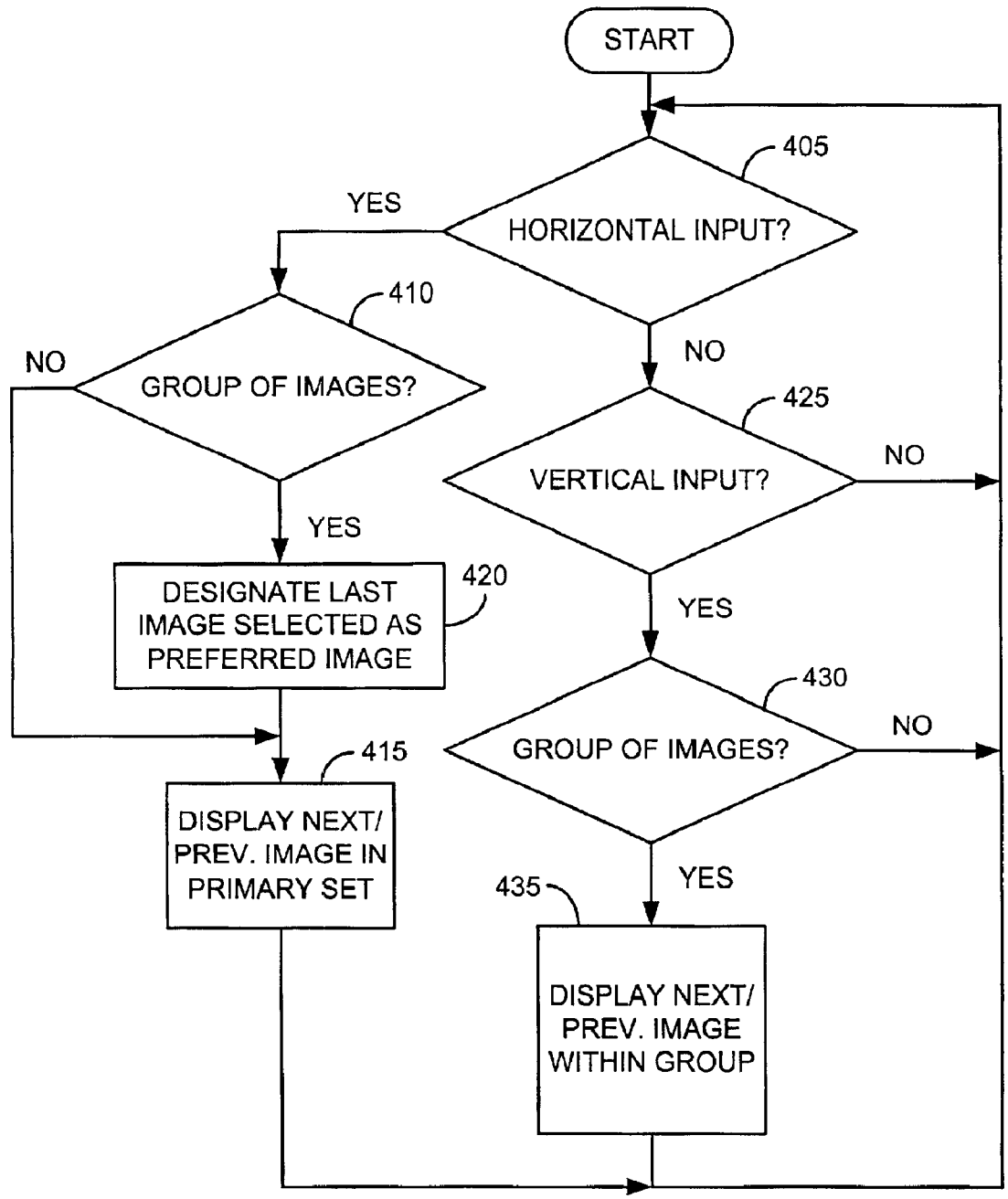
FIG. 4 is a flowchart of the operation of the digital camera user interface shown in FIG. 2 in accordance with an exemplary embodiment of the invention.

FIG. 4 is a flowchart of the operation of the digital camera user interface shown in FIG. 2 in accordance with an exemplary embodiment of the invention. The method of FIG. 4 corresponds to the organizational scheme shown in FIG. 3A. At 405, input from horizontal input control 205 is detected. Horizontal input control 205, in this embodiment, selects for viewing on display 130 images in primary set 320. That is, a user may scroll through images in primary set 320 by activating horizontal input control 205 in the desired direction. If input from horizontal input control 205 is received at 405, controller 105 determines at 410 whether the currently displayed image is an individual image 305 or part of a group of images 310. If it is an individual image, the next or previous image in the primary set is displayed at 415, depending on the direction of the input at 405. If the currently displayed image belongs to a group of images 310 at 410, the currently displayed image is designated as a preferred image 315 for its associated group at 420, and control proceeds to 415, where the next or previous image in primary set 320 is displayed. If input is received from vertical input control 210 at 425, control proceeds to 430, where controller 105 determines whether the currently displayed image is an individual image 305 in primary set 320 or part of a group of images 310. If it is part of a group of images 310, the next or previous image within the group of images 310 is displayed at 435. Otherwise, the input from vertical input control 210 is ignored because, in this embodiment, vertical input control 210 is used to navigate within groups of images 310, not individual images 305. Thus, horizontal input control 205 may be used to navigate among primary set 320, and vertical input control 210 may be used to navigate within a group of images 310 whenever horizontal input control 205 has selected a preferred image 315. The last image viewed within a group of images 310 before an image outside the group is selected using horizontal input control 205 becomes the preferred image 315 for the associated group 310 and thereby becomes a member of primary set 320. Alternatively, a user may manually designate a selected image as the preferred image 315 for a group of images 310. This may be accomplished via an appropriate user interface command from input device 125. Those skilled in the art will recognize that the roles of horizontal input control 205 and vertical input control 210 may be interchanged so that vertical input control 210 selects images for viewing from primary set 320 and horizontal input control 205 selects images for viewing within a group of images 310.

Figure 5A:
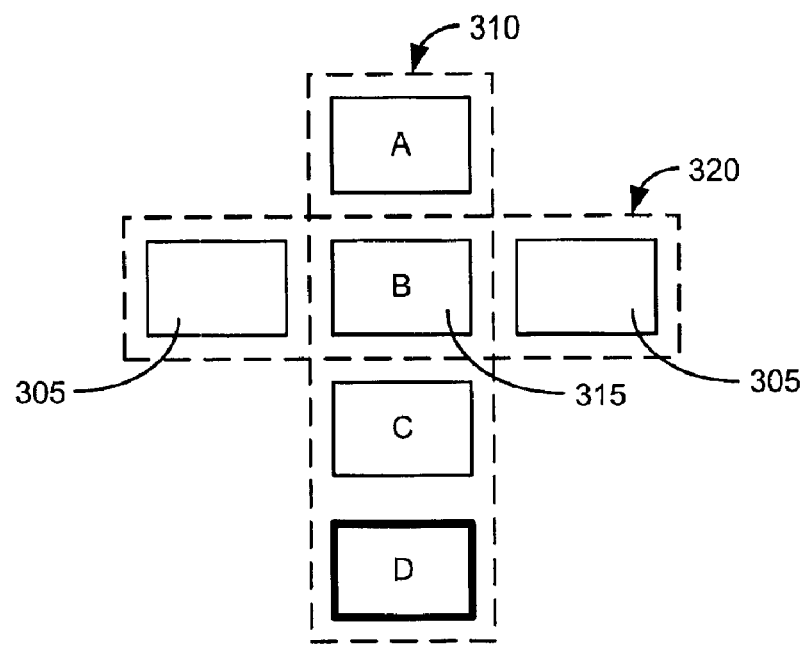
FIGS. 5A–5B are diagrams illustrating steps to designate a preferred image within a group of images in accordance with the exemplary method of operation shown in FIG. 4.
Figure 5B:
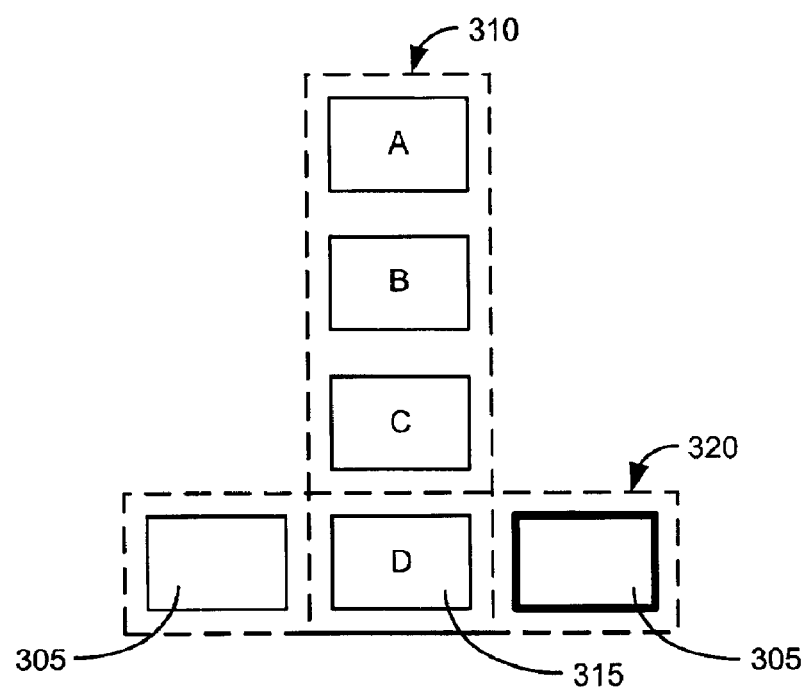

FIGS. 5A and 5B illustrate the process of selecting a new preferred image 315 for a group of images 310 in accordance with the exemplary method of operation in FIG. 4. As in FIG. 3A, FIGS. 5A and 5B are conceptual diagrams, not literal representations of the organization of memory 120 or the layout of display 130. In FIG. 5A, group of images 310 comprises four images, labeled "A" through "D." Image "B" is the preferred image 315, and primary set 320 comprises image "B" and the two individual images 305. Image "D" (shown in bold outline) represents the image currently displayed and selected on display 130. Image "D" may be selected by navigating to image "B" using horizontal input control 205 and to image "D" using vertical input control

210. When horizontal input control 205 is subsequently activated to the right, as shown in FIG. 5B, individual image 305 (shown in bold outline) is displayed, and image "D," being the last image selected for viewing in group of images 310, becomes the new preferred image 315. Subsequent activation to the left of horizontal input control 205 will, therefore, display image "D."

Figure 6:
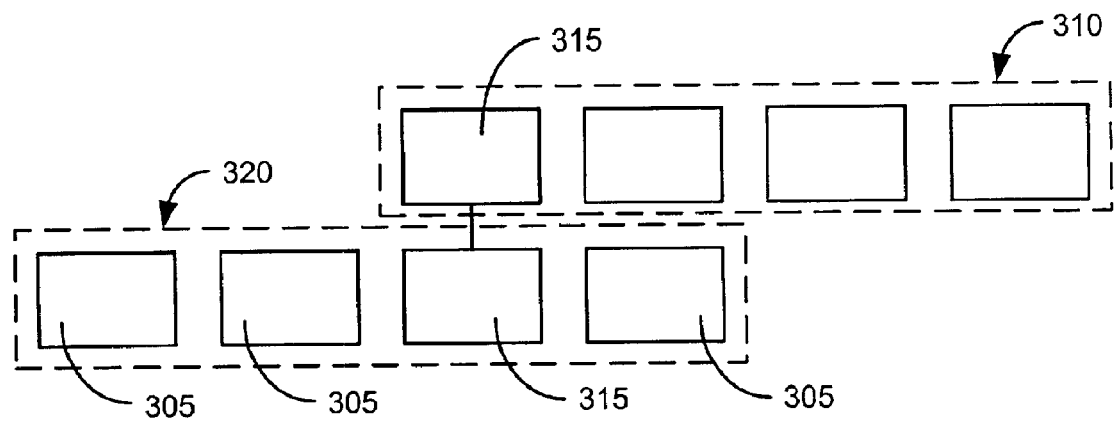
FIG. 6 is a diagram of an organizational scheme for images stored in a digital camera in accordance with another exemplary embodiment of the invention.

FIG. 6 is a conceptual diagram showing an organization scheme for images stored in digital camera 100 in accordance with another exemplary embodiment of the invention. In this embodiment, images may still be divided into individual images 305, groups of images 310, and a primary set 320 comprising the individual images 305 and preferred images 315. The roles of horizontal input control 205 and vertical input control 210, however, are somewhat different. Horizontal input control 205 may be used to navigate among and display images in primary set 320. Vertical input control 210 is used to access, but not navigate among, the images in group of images 310. That is, a single press of vertical input control 210 (typically in the "up" direction) when preferred image 315 is the currently selected image causes a different set of images, group of images 310, to become accessible for navigation without disturbing the displaying of preferred image 320. Horizontal input control 205 is then used to navigate among and display the images within group of images 310. A subsequent press of vertical input control 210 (typically in the "down" direction) exits group of images 310, and the last image selected for display in group of images 310 becomes the new preferred image 315 belonging to both group of images 310 and primary set 320.

Figure 7:
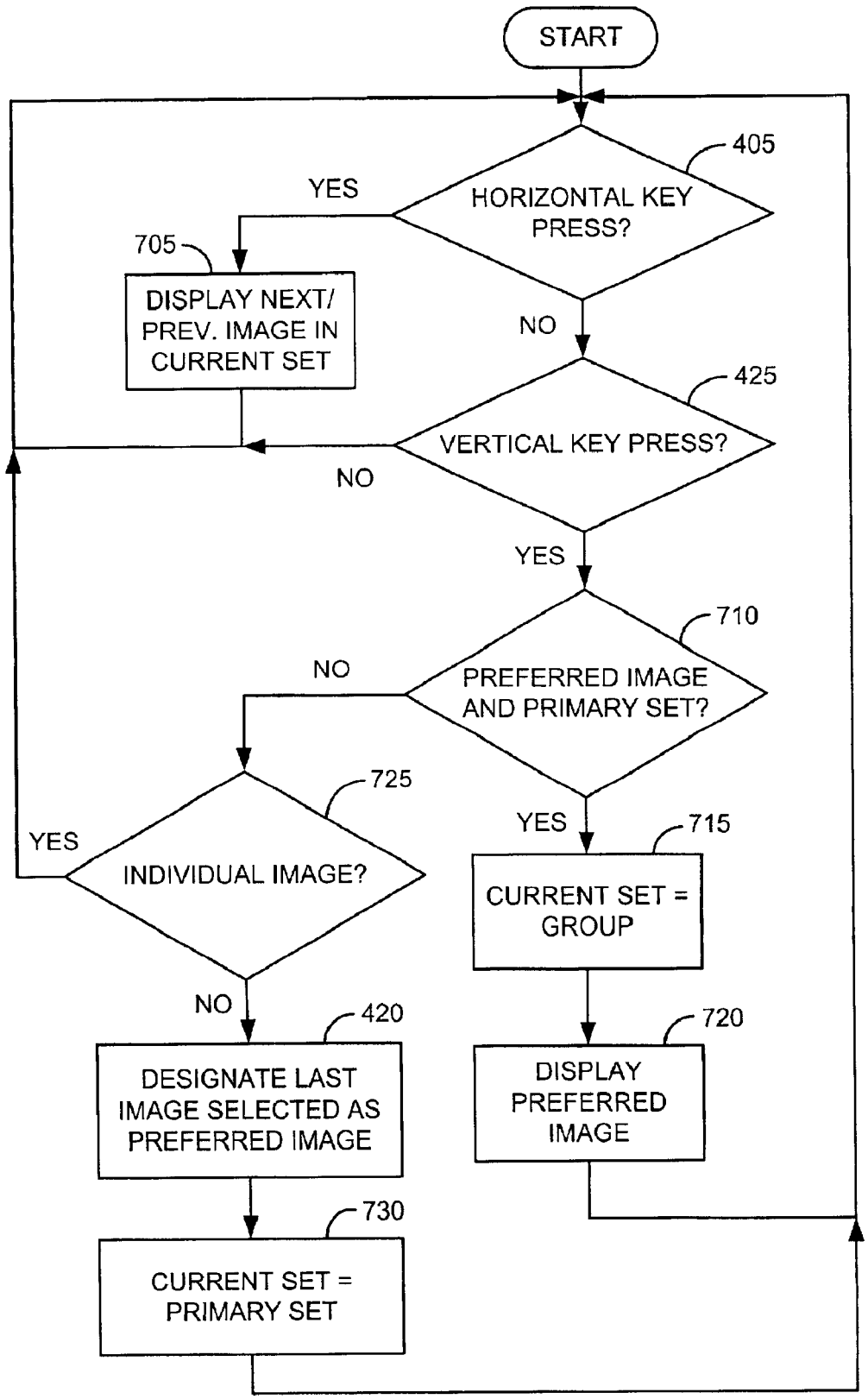
FIG. 7 is a flowchart of the operation of the digital camera user interface shown in FIG. 2 in accordance with another exemplary embodiment of the invention.

FIG. 7 is a flowchart of the operation of the digital camera user interface shown in FIG. 2 in accordance with another exemplary embodiment of the invention. The method of FIG. 7 corresponds to the organizational scheme shown in FIG. 6. In FIG. 7, input from horizontal input control 205 is detected at 405. If input is received from horizontal input control 205, the next or previous image in the currently selected set of images, either primary set 320 or a group of images 310, is displayed at 705. If instead input is received from vertical input control 210 at 425, controller 105 determines at 710 whether the currently displayed image is a preferred image 315 and whether the currently selected set of images is primary set 320. If so, the group of images 310 associated with the currently displayed preferred image 315 is selected as the current set of images for navigation and display at 715. The preferred image 315 may continue to be displayed at 720 until a different image within group of images 310 is displayed using horizontal input control 205. If the image currently displayed at 710 is an individual image 305, or if the currently selected set of images for navigation and display is a group of images 310, control proceeds to 725. If at 725 the currently selected set of images is a group of images 310, the last image selected for display from group of images 310 prior to the activation of vertical input control 210 at 710 is designated as the preferred image 315 at 420. Alternatively, a user may manually designate a selected image as the preferred image 315 for a group of images 310 before exiting group of images 310. At 730, the primary set 320 is selected as the current set of images for navigation and display.

Figure 8A:
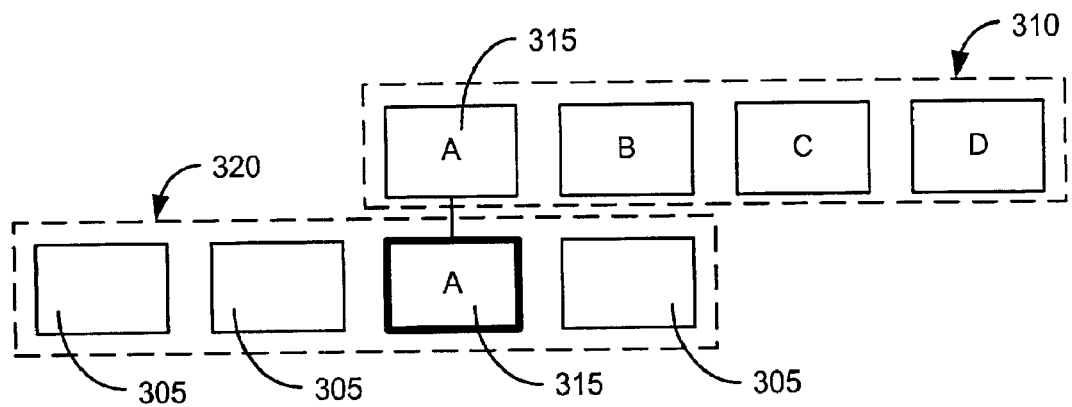
FIGS. 8A–8D are diagrams of a sequence of steps to designate a preferred image within a group of images in accordance with the exemplary method of operation shown in FIG. 7.
Figure 8B:
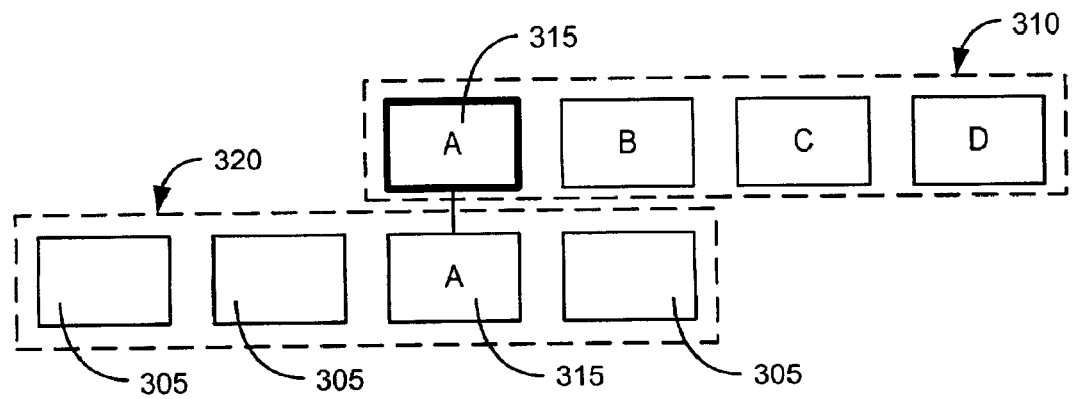
Figure 8C:
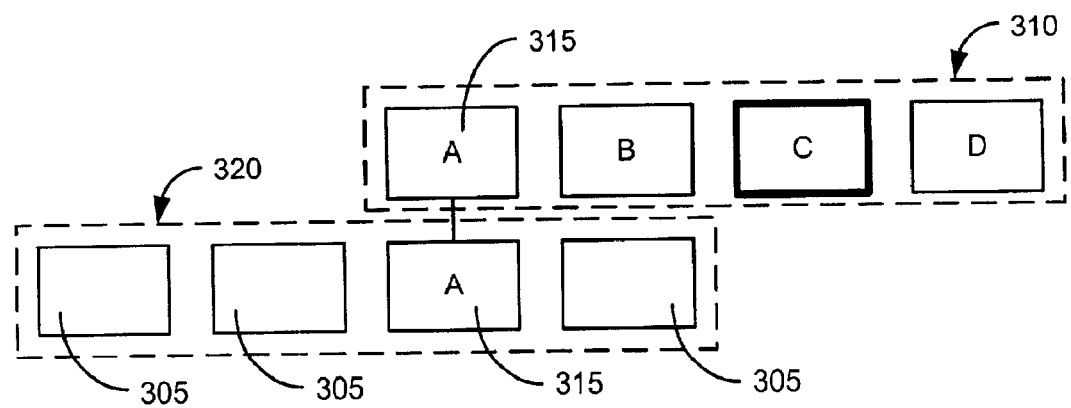
Figure 8D:
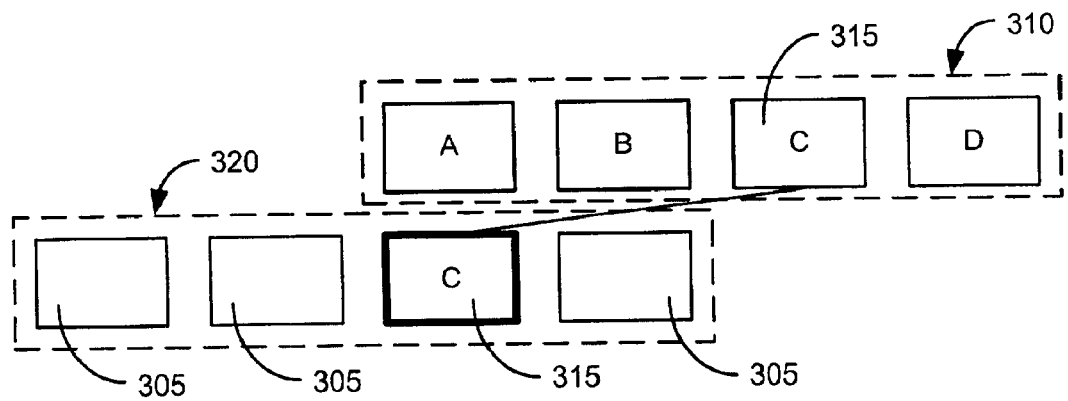

FIGS. 8A–8D illustrate the process of selecting a new preferred image 315 for a group of images 310 in accordance with the exemplary method of operation in FIG. 7. In FIG. 8A, horizontal input control 205 has been used to select the preferred image 315 labeled "A" (shown in bold outline), which belongs to both primary set 320 and group of images 310. A press of vertical input control 210 causes group of images 310 to become the currently selected set of images for navigation and display, as shown in FIG. 8B. Image "A," however may still be displayed. In FIG. 8C, horizontal input control 205 is used to select image "C." Finally, another press of vertical input control 210 causes image "C" to become the new preferred image 315, as shown in FIG. 8D. At this point, image "C" has become a member of both primary set 320 and group of images 310.

Visual or audio feedback may be added to display 130 to indicate whether an image is an individual image 305 or an image belonging to a group of images 310. Further feedback may be added to indicate preferred images 315. One advantageous method to implement visual feedback is a small icon superimposed over the image in, for example, a corner. Such techniques are well known in the digital camera art. The displayed icon may change depending on which type of image is being displayed or the mode in which digital camera 100 is currently operating.

Figure 9A:
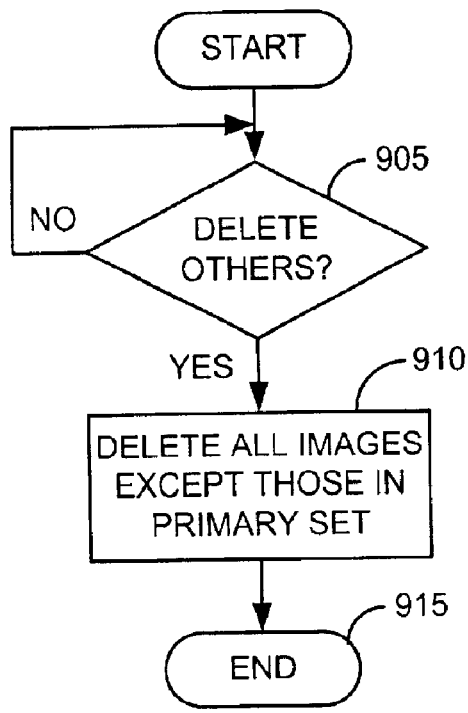
FIG. 9A is a flowchart of a method for deleting all digital images except a primary set of images in accordance with an exemplary embodiment of the invention.

FIG. 9A is a flowchart of a method for deleting all digital images except primary set 320 in accordance with an exemplary embodiment of the invention. If a "delete others" command or its equivalent is received from input device 125 at 905, controller 105 identifies all images not belonging to primary set 320 and deletes them, after which the process ends at 915. This capability is a convenient way for the user to save memory by eliminating unwanted images.

Figure 9B:
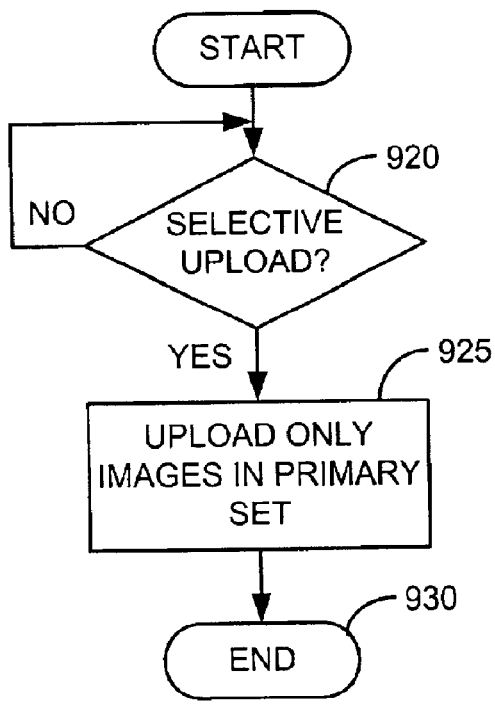
FIG. 9B is a flowchart of a method for uploading to an external device a primary set of images in accordance with an exemplary embodiment of the invention.

FIG. 9B is a flowchart of a method for uploading primary set 320 to an external device in accordance with an exemplary embodiment of the invention. The external device may be any device capable of communicating with digital camera 100 via communication interface 135. Examples include desktop or notebook personal computers (PCs), printers, handheld computers, projection systems, and external storage devices. This capability is useful, for example, when a user desires to display only primary-set images in a slide show, print only primary-set images, or upload only primary-set images to a PC for further processing or archiving. At 920, a selective upload command from input device 125 causes controller 105 to establish a communication link with the external device via communication interface 135. At 925, the images comprising primary set 320 are uploaded to the external device, after which the process ends at 915.

Figures 10A, 10B, 10C:
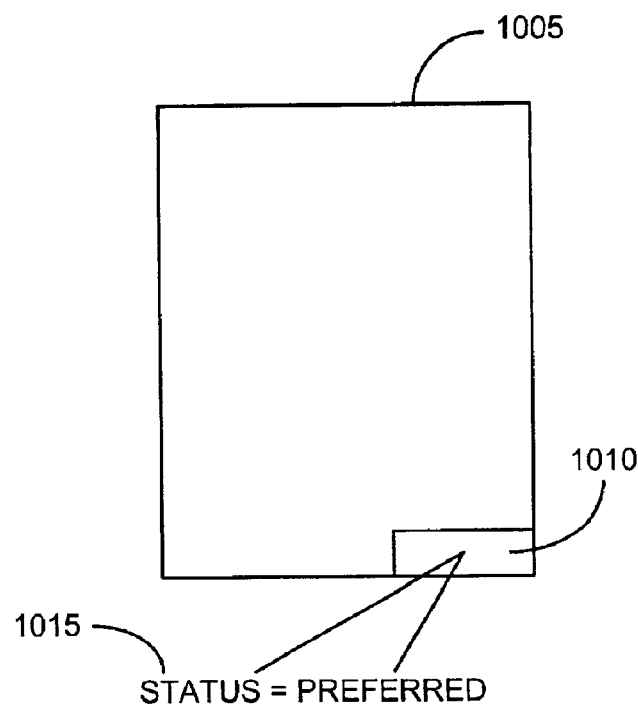
FIGS. 10A–10C are illustrations of various methods for designating preferred images.

Several methods may be used to designate and keep track of preferred images 315. Three examples are illustrated in FIGS. 10A–10C. In FIG. 10A, image file 1005 includes a set of tags 1010 containing information about the image. A tag 1015 may be included to indicate that an image is a preferred image 315. In FIG. 10B, the internal file system of digital camera 100 includes an attribute to indicate whether or not each image in the directory is a preferred image. Finally, in FIG. 10C, a list of preferred images is maintained and updated as required. An identifier as simple as an integer may be used to represent each image in the list of preferred images.

Figure 11A:
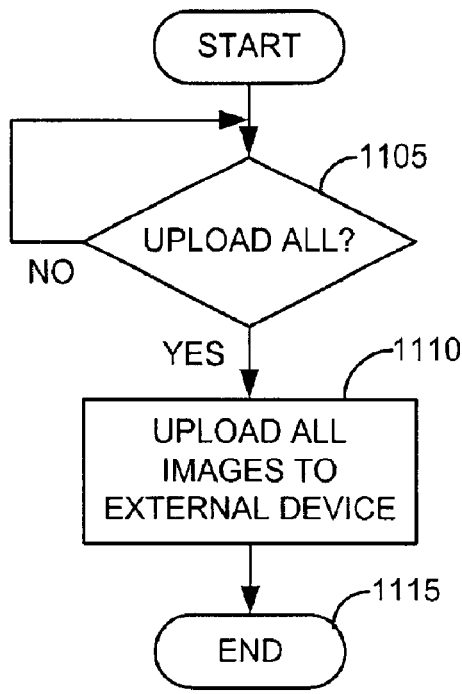
FIGS. 11A and 11B are flowcharts of an alternative method for uploading images to an external device and subsequently manipulating them in accordance with an exemplary embodiment of the invention.
Figure 11B:
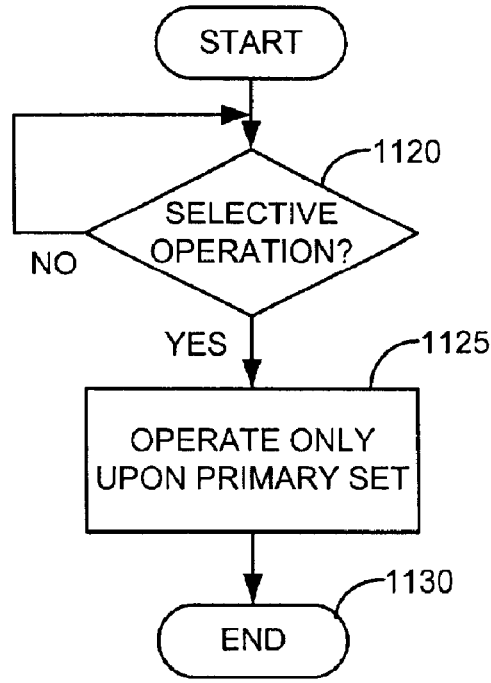

A variation of the method shown in FIG. 9B is shown in FIGS. 11A and 11B. In this embodiment, all images from digital camera 100 are uploaded to an external device such as a PC, and each image belonging to primary set 320 contains a tag 1015 as explained in connection with FIG. 10A. Since the images belonging to primary set 320 may be identified from their tags 1015, the external device may optionally operate only upon the images belonging to primary set 320. For example, after all images from digital camera 100 have been uploaded to a PC, the PC may optionally print or upload to a Web server only those images belonging to primary set 320. Similarly, the PC may select only images from primary set 320 during a slide show. In FIG. 11A, an upload command at 1105 causes all images stored in digital camera 100 to be uploaded to an external device at 1110, after which the process terminates at 1115. If a selective operation on the stored images is subsequently requested at 1120 in FIG. 11B, the external device performs the requested operation only on images belonging to primary set 320 at 1125, after which the process terminates at 1130. As explained above, the selective operation may be printing, uploading to a Web server, selection for a slide show, or any other manipulation of primary set 320 that may be performed by the external device.

Although the invention has been described in the context of digital cameras, it may be applied to any image capture, storage, or display device in which it is desirable to browse collections of images comprising both individual images and groups of images. Examples include palmtop computers, personal digital assistants (PDAs), PCs, and "communicator phones" (radiotelephones that include PDA capabilities). These devices typically include input controls similar to those shown in FIG. 2.

The foregoing description of the present invention has been presented for the purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for manipulating images stored in a device, comprising:

selecting for display an image belonging to both a first and a second set of images using a first control;

accessing the second set of images using a second control;

selecting for display a different image belonging to the second set of images using the first control;

exiting the second set of images using the second control;

designating the most recently selected image belonging to the second set of images as a preferred image, the preferred image thereby becoming a member of both the first and second sets of images.

2. The method of claim 1, wherein designating the most recently selected image belonging to the second set of images as a preferred image comprises embedding a tag within the most recently displayed image belonging to the second set of images.

3. The method of claim 1, wherein designating the most recently selected image belonging to the second set of images as a preferred image comprises setting a directory attribute associated with the most recently displayed image belonging to the second set of images.

4. The method of claim 1, wherein designating the most recently selected image belonging to the second set of images as a preferred image comprises adding to a list of preferred images an identifier corresponding to the most recently displayed image belonging to the second set of images.

5. The method of claim 1, further comprising:

deleting all images stored in the device except those belonging to the first set of images.

6. The method of claim 1, further comprising:

uploading the first set of images to an external device.

7. The method of claim 6, wherein all images stored in the device are uploaded to the external device, the external device subsequently operating upon only the first set of images by identifying a tag embedded within each image belonging to the first set of images.

8. The method of claim 1, wherein the device is a digital camera, a palmtop computer, a PDA, a personal computer, or a communicator phone.

* * * * *